Nov. 1, 1966  W. P. BAMFORD ETAL  3,282,014
AUTOMOTIVE WINDOWS
Filed July 6, 1964

INVENTORS
William P. Bamford,
BY Kenyon E. Golding and
James Glenn Morgan
Nobbe & Swope
ATTORNEYS

United States Patent Office 3,282,014
Patented Nov. 1, 1966

3,282,014
AUTOMOTIVE WINDOWS
William P. Bamford, Maumee, Kenyon E. Golding, Waterville, and James Glenn Morgan, Toledo, Ohio, assignors to Libbey-Owens-Ford Glass Company, Toledo, Ohio, a corporation of Ohio
Filed July 6, 1964, Ser. No. 380,216
3 Claims. (Cl. 52—627)

The present invention relates broadly to automotive glass windows and more particularly to window panels which are provided with, and/or have been treated to retain, a mounting channel or molding along a marginal edge thereof.

While not limited thereto, the present invention contemplates, in a preferred embodiment, an automotive glass window pane or panel at least one edge of which has been treated to provide it with a non-slip margin or margins over which may be fitted a channel shaped mounting member of metal or plastic with a layer of resilient or compressible material between the treated surface on the glass and the channel.

It is a primary object of the invention to provide, a rough surface on a margin of a glass sheet that will not materially weaken the glass and that will act to prevent any mounting means associated therewith from shifting relative to the glass during normal use.

A further object is to provide an automotive glass glazing unit including a glass panel provided with a mounting channel firmly fixed to one edge thereof.

Another object is the provision, for use as a panel in an automotive glazing structure, of a glass sheet which has been coated to produce a rough surface along a margin thereof.

Further objects and advantages of the invention will become more apparent during the course of the following description when taken in connection with the accompanying drawings.

In the drawings, wherein like numerals are employed to designate like parts throughout the same:

Figure 1:
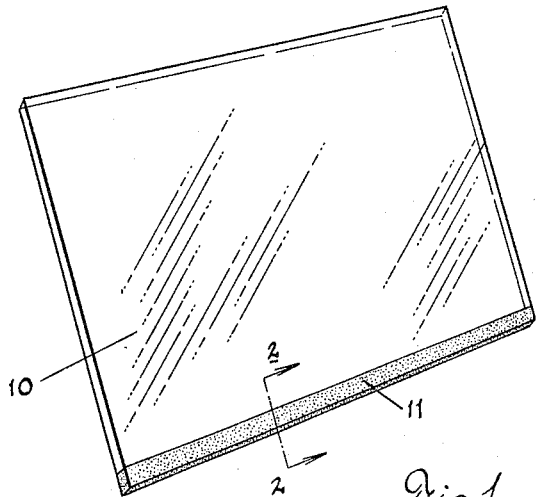
FIG. 1 is a perspective view of a glass sheet that has been treated to provide the special marginal edge surface of the invention.
Figure 2:
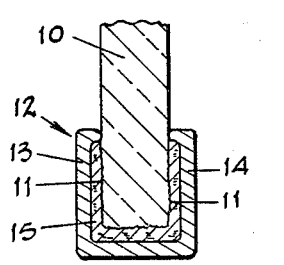
FIG. 2 is a fragmentary, sectional view taken substantially along the line 2—2 of FIG. 1 and showing the treated margin of the glass sheet surrounded by a mounting channel.

Referring now more particularly to FIGS. 1 and 2 of the drawings, there has been shown in FIG. 1 a sheet of glass 10 which is preferably safety glass. This may be either tempered or laminated safety glass and, in any event, has had its lower edge and adjacent margins treated in accordance with this invention to provide a rough surface 11 thereon.

As will be more clearly hereinafter explained, the treatment of the marginal edge of the glass sheet 10 may be any one of a number which will provide a surface on at least one margin of the glass that is rough or otherwise tractional so that when a mounting member such as a channel 12 as shown in FIG. 2 is mounted against or in surrounding relation to the treated surface the texture thereof will prevent the glass from being displaced within or slipping out of the mounting member. Where a mounting channel such as 12 is employed in surrounding relation to the edge of the glass sheet, the channel may be formed so that the upper portions of the side walls 13 and 14 thereof will exert a pinching or clamping action against the glass and it is also customary to insert between the glass and the channel a resilient layer 15 which may be rubber, cork, felt or the like.

However, regardless of the specific construction, the present invention contemplates a rough or otherwise tractive surface on marginal and/or edge surfaces of a glass sheet or panel that will serve to retain a mounting member in fixed relationship with the glass panel in a glazing structure and effectively prevent the glass from slipping out of the channel or away from its mounting in normal use.

Figure 3:
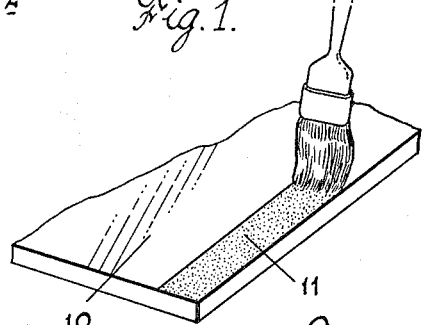
FIG. 3 is a schematic view showing one way of treating the margin of a glass sheet in accordance with the invention.

FIG. 3 of the drawings illustrates diagrammatically one way in which the margin of the glass sheet can be treated to provide the rough or tractional surface of the invention and as there shown this is accomplished by applying a light coating of an enamel contacting a gritty filler which will provide the roughened surface when the enamel has been dried or fired.

Such a material may be applied either by brushing as shown or by a spray, roller or screen process and may be either air dried or fired in place depending on the composition of the paint or enamel used.

Regardless of whether the enamel is of the air dry or fired-on variety it is usually applied in approximately .001" to .003" thick coats and the gritty filler used is preferably of a particle size between approximately .0005 inch and .005 inch to insure the filler particles extending far enough out of the enamel layer to provide the necessary traction while at the same time being embedded in the enamel layer to an extent sufficient to insure that each particle will be firmly and securely held in place. Suitable fillers for this purpose are finely divided metal, alumina, silica, etc.

When a type of enamel that requires baking or firing is employed and the glass sheet 10 is bent, tempered or otherwise heat treated it may be advantageous to apply the enamel to the glass prior to the heat treating operation so that the heat required for the bending or tempering may also be used to fire the enamel onto the glass.

Such fired-on type enamels are conventionally made up of a finely divided glass or enamel frit in a liquid vehicle and for purposes of this invention the frit employed should have a lower melting point but substantially the same coefficient of expansion as the glass to be coated. On the other hand the gritty filler used must have a higher melting point than the frit.

As examples of grit-filled, fired-on types of enamels, suitable for practicing this invention, that are obtainable commercially, we have successfully used B. F. Drakenfeld & Co.'s No. 26–631 chalkboard green glass enamel in alcohol and water plus their 122 medium; and a matte translucent glass enamel sold by the Harshaw Chemical Co. as their D–781 and D–782 in N–628 oil.

Examples of the use of two specifically different forms of fired-on type enamels in practicing the invention are set forth below:

EXAMPLE I

An enamel was made up by mixing a glass base frit, having a lower softening point but substantially the same coefficient of expansion as soda-lime-silica glass in a particle size passing through a 325 mesh screen, in a conventional liquid vehicle with approximately 15% by weight of alumina as the opacity filler of gritty material. This mixture was applied to the margin of a sheet of ordinary plate glass by a screening operation using a stainless steel screen and the enamel then fired in place by heating the coated glass sheet to approximately its point of softening.

EXAMPLE II

A similar procedure was followed using the same materials except that there was substituted for the alumina which made up the gritty filler in Example I a second glass frit of similar particle size to the first but having a higher melting point so that when the enamel coat was fired onto the glass it was rough by reason of the presence of the unmelted particles of the second glass frit.

In addition to the screen method of application, the enamels of Examples I and II were also successfully applied to plate glass surfaces by a masking and spraying operation and by a printing operation with a rubber roller.

Figure 4:
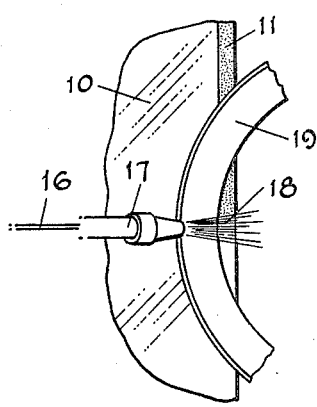
FIG. 4 is a diagrammatic view of a second way of treating a glass sheet margin.

As an alternate to the painting or enameling treatment, the glass sheet 10 may be provided with a rough, tractional surface at its margins by metallizing as shown diagrammatically in FIG. 4. This can be done by atomizing the metal of a wire 16 that is continuously fed to a gun 17 and directing the atomized spray 18 toward a rotating masking template 19 and onto the glass sheet 10 in a manner that is well known in the art.

Figure 5:
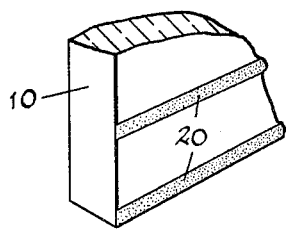
FIG. 5 is a fragmentary view similar to FIG. 1, showing a modified design of treated margin.

In any event it will be appreciated that the invention in its broader aspects is not restricted to any specific method of treatment to obtain the desired rough, tractional surface on the margin of the glass sheets since this may be accomplished in any one of a number of different ways. Similarly, various patterns of rough surfaces may be created such as by a marginal coating on one surface only, or on opposite surfaces only, and with and without an edge coating; or the coating may be applied as spaced strips 20 (FIG. 5).

In fact it is to be understood that the forms of the invention herewith shown and described are to be taken as illustrative embodiments only of the same, and that various changes in the shape, size and arrangement of parts, as well as various procedural changes may be resorted to without departing from the spirit of the invention defined in the following claims.

We claim:

1. A transparent glazing panel for automobiles comprising a sheet of glass, a coating confined to and extending along a margin of said sheet and having a rough outwardly directed surface, a channel shaped mounting member in surrounding relation to said margin and a layer of permanently compressible material between said rough surface and said mounting member.

2. A panel as defined in claim 1 in which said coating is a frit having a substantially equal coefficient of expansion but a lower melting point than the glass in said sheet, and said frit contains particles of a material having a higher melting point than said frit.

3. A panel as defined in claim 2 in which said coating is between approximately .001 and .003 inch thick, and said particles are between .0005 and .005 inch in their maximum dimensions.

References Cited by the Examiner

UNITED STATES PATENTS

| | | | |
|---|---|---|---|
| 627,378 | 6/1899 | Alexander | 65—60 X |
| 652,091 | 6/1900 | Davis | 65—60 |
| 653,252 | 7/1900 | Lawton et al. | 65—60 X |
| 1,251,450 | 12/1917 | Alcan | 65—60 X |
| 1,374,136 | 4/1921 | Beecher | 65—60 X |
| 2,999,337 | 9/1961 | Sharp | 65—58 X |

FOREIGN PATENTS

| | | |
|---|---|---|
| 532,359 | 10/1956 | Canada. |
| 4,242 | 1/1903 | Great Britain. |

HARRISON R. MOSELEY, *Primary Examiner.*

W. E. HEATON, *Assistant Examiner.*